Figure 1:
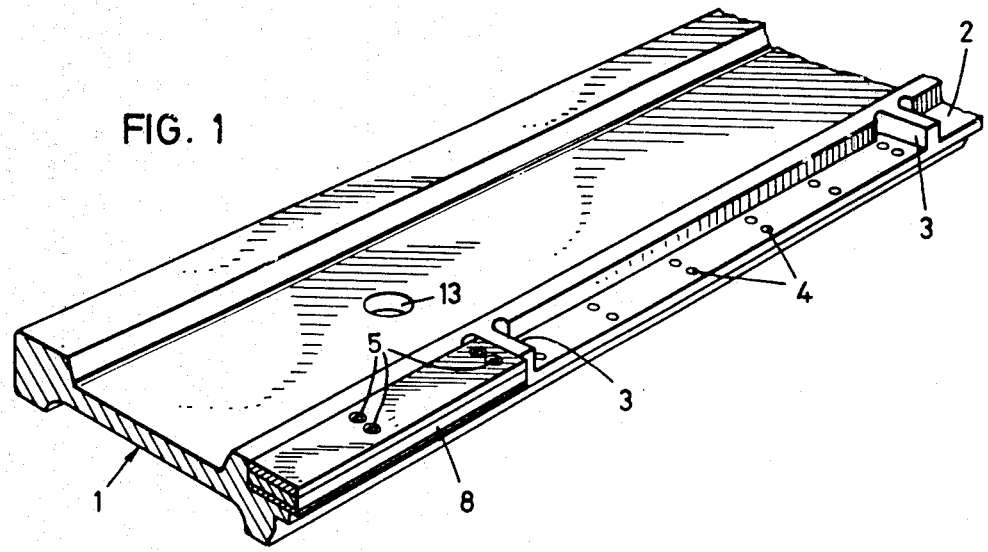

United States Patent [19]

Schüpbach et al.

[11] 4,267,902
[45] May 19, 1981

[54] RAILWAY CAR RETARDER

[75] Inventors: Hans-Rudolf Schüpbach, Rosshäusern; Eric J. Rathe, Russikon, both of Switzerland

[73] Assignee: Schweizerische Bundesbahnen (Bauabteilung der Generaldirektion), Bern, Switzerland

[21] Appl. No.: 82,028

[22] Filed: Oct. 5, 1979

[30] Foreign Application Priority Data

Nov. 16, 1978 [CH] Switzerland ............... 11793/78

[51] Int. Cl.³ .............................................. B61K 7/04
[52] U.S. Cl. ......................................... 188/62; 188/240
[58] Field of Search ............... 188/62, 219.1, 222.1, 188/222.6, 234, 240, 250 R, 250 B, 250 G; 104/26 A

[56] References Cited

U.S. PATENT DOCUMENTS

| 836,269 | 11/1906 | Miner | 188/62 |
|---|---|---|---|
| 1,153,154 | 9/1915 | Connelly | 188/240 |
| 1,778,528 | 10/1930 | Howard | 188/62 |
| 3,519,107 | 7/1970 | Bellinger | 188/62 |
| 3,809,188 | 5/1974 | Frank et al. | 188/62 |
| 4,030,574 | 6/1977 | Evans | 188/62 |
| 4,064,976 | 12/1977 | Muller | 188/234 |

FOREIGN PATENT DOCUMENTS

| 337246 | 10/1976 | Austria . |
| 403824 | 7/1934 | Belgium . |
| 2254005 | 12/1974 | Fed. Rep. of Germany . |
| 975702 | 3/1951 | France . |
| 1172031 | 2/1959 | France . |
| 1214985 | 4/1960 | France . |
| 2254467 | 7/1975 | France . |
| 2330577 | 6/1977 | France . |
| 382283 | 10/1932 | United Kingdom . |
| 1169487 | 11/1969 | United Kingdom . |

*Primary Examiner*—Edward R. Kazenske
*Attorney, Agent, or Firm*—Darby & Darby

[57] ABSTRACT

Two beams of a railway car retarder which are located on opposite sides of a track rail are provided with brake shoes in the form of segments. The segments are positioned in recesses on the inside longitudinal sides of the beams. The recesses are separated from one another by web ribs. The segments are form-closed with the longitudinal recesses of the beams and fixedly located therein. By means of this braking system the squeaking sounds arising during the braking operation are substantially reduced.

3 Claims, 2 Drawing Figures

RAILWAY CAR RETARDER

The invention relates to a railway car retarder having two brake beams located on opposite sides of a track rail and running parallel with the rail, said beams being provided with segments functioning as braking shoes arranged one after the other on the beams and forming a brake groove for the wheels of a passing railway car to be braked, the longitudinal recesses therein.

Railway car retarders of this type are used for braking rolling stock in a shunting station to a predetermined velocity or to stop it completely. During the braking operation the brake beam of such car retarders are urged into engagement with the side surfaces of the car wheels after they have been raised from their initial position. During the braking operation there arise shrill, squeaking sounds of a considerable noise intensity. The cause of such sounds is the vibration of the car wheels because of the friction between the brake shoes of the brake beams and the car wheels. Such squeaking sounds are annoying for the environment.

Different means have been used to at least partially reduce the high level of the squeaking sounds generated during the braking operation. The contact surfaces between the brake shoes and the car wheels have been sprinkled with a liquid or half-liquid braking means comprising a carrier liquid and a granular braking material. Further experiments have been made with watery paste, oil/water emulsions or liquid foam material, all of which have been applied to the friction surfaces; however, such means have brought comparatively limited results and, besides, they are expensive because large quantities of the materials have had to be used.

According to the teaching of the German patent No. 2,254,005, the vibration of the car wheels is absorbed during the braking operation by a rail made of a rubber elastic material which is positioned along the track rail and urged into engagement with the side surfaces of the car wheels as they pass. By such an arrangement the level of the squeaking sounds arising during the braking operation has been reduced.

Although there is only a slight contact between the car wheels and the elastic rail made of rubber, nevertheless the rubber rail will still be gradually destroyed by the passing locomotives and the complete trains. Moreover, the production and the installation of such an additional elastic rail made of rubber is expensive.

In Austrian patent No. 337,246 there are described brake beams with segment brake shoes attached to them from their longitudinal sides by horizontal screw bolts. Such brake beams are used for braking railway cars passing with a velocity of more than 2–3 m/sec. By means of such segment brake shoes the noise development can be effectively suppressed because only the brake shoes attached to the pressure surfaces of the brake beams are stimulated to natural vibrations owing to the friction between the brake beams and the side surfaces of the wheels of the car to be braked.

The disadvantage of such brake beams having segment brake shoes attached to them for their longitudinal sides is that the squeaking sound at passing velocities of less than 2–3 m/sec. is again as intensive as it is with the brake beams having no segment brake shoes. The mounting and dismantling of the segment brake shoes attached from the longitudinal side of the brake beams by horizontal screw bolts is rendered by want of space.

It is an object of the invention to provide a railway car retarder which also allows reduction of the sound level generated during the braking operation of railway cars passing with a velocity of less than 2–3 m/sec. The railway car retarder should be constructed in such a way as to enabled a quick and easy exchange of the brake shoes.

According to the invention, the bottom surface of each recess lying in the horizontal plane is broader than the height of the recess, and the recesses are separated from one another by web ribs running transversely to the longitudinal axes of the beams, the segments being fixedly located in the recesses.

It is advantageous when the segments are retained in the recesses by means of vertical bolts, the shorter lateral surfaces of the segments abut against the web ribs, and the longer lateral surfaces of the segments functioning as actual brake surfaces are exposed and extend beyond the longitudinal edges of the beams.

Figure 2:
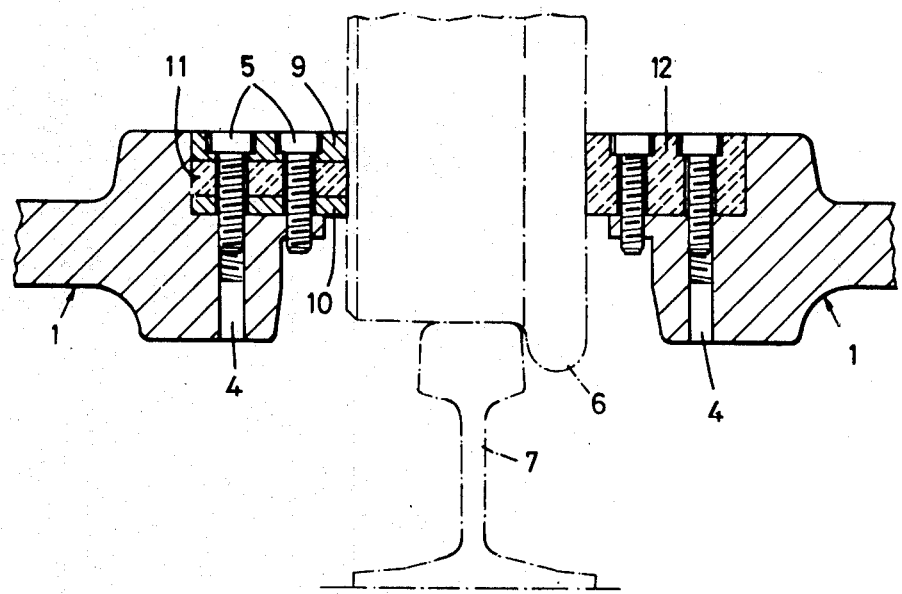

A preferred embodiment of the invention will be more particularly described with reference to the accompanying drawings in which:

FIG. 1 is a perspective view of a railway car retarder with an outside brake beam having shoes and FIG. 2 is a cross-sectional view of a pair of brake beams of the railway car retarder according to FIG. 1, with a car wheel in dot-dash lines.

Referring to FIG. 2, it will be apparent that there is provided on each side of a track rail 7 a brake beam 1 respectively running parallel to the track rail 7. In the same way, one brake beam of a second pair of brake beams (not shown) is provided on each side of a second track rail. Only one pair of brake beams is to be provided on opposite sides of a track rail with a one-sided railway car retarder. The brake shoes of the brake beams 1 consist of segments 8 or 12, as is evident from FIGS. 1 and 2, forming between them a brake groove for braking the wheels 6 (see FIG. 2) of railway cars passing on the rails 7.

As is evident from FIG. 1, the inside longitudinal side of each brake beam 1 is provided with recesses 2 opening upward. The recesses 2 are separated from one another by web ribs 3 running transversely to the longitudinal axis of the brake beam 1. The recesses 2 are advantageously approximately 650 to 700 mm long. The segments 8,12 are located in these recesses 2 in such a way that they abut with their smaller side surfaces against the web ribs 3; the segments 8, 12 are fixed in the recesses 2 by means of vertically running screw bolts 5. The holes in the recesses 2 for the screw bolts 5 are designated by reference numeral 4. The holes for screw bolts (not shown) by means of which the brake beams 1 are attached to a support (not shown) are designated by reference numeral 13.

It is advantageous to construct the segments 8 on at least the outer brake beam 1 of the beam pairs as sandwich segments, meaning that the segments consist of several horizontal layers 9,11,10. The narrow longitudinal sides of these layers form the actual braking surfaces; when the brake beams are urged into engagement with the surfaces of the car wheels, these narrow longitudinal surfaces abut against the wheel tire, as it is evident from FIG. 2. The individual layers of the segments 8 can consist, e.g., of an upper layer 9 made of steel, a lower layer 10 equally made of steel, and layer 11 inserted between the upper layer 9 and the lower layer 10. This insert layer 11 can be made, e.g., of plastic, iron, iron alloy, non-ferrous metals, sintered metals, ceramics, or an organic material such as wood. It is also possible to combine the materials at will and to use them in any of the layers 9, 11, 10. The segments on the inside beam 1 of each beam pair are preferably built as one-piece solid segments 12. The material of these solid segments can be the same as the material of the segments on the outer beams. Even here the materials can be combined at will. The retarder can be constructed in such a way that mostly the segments on the inside beams have the braking function, and the segments on the outer beams provide only for counter pressure without producing any substantial braking effect. At the same time the segments on the outer beams have sufficienct gliding ability because they are lubricated. It is also possible to arrange the segments on the outer beams as well as the inside beam in the form of sandwiches or as one-piece solid segments.

The segments 8, 12 are form-closed with the longitudinal sides of the brake beams 1, in which they are mounted. In this way the forces arising during the braking operation are directly absorbed by the beams and transferred to the support. Accordingly, non-metallic segment materials as well as sandwich segments can be used. The screw bolts 5 function primarily as retention bolts; however, they do not absorb any pressures but only small braking forces.

The segments can be worn on both longitudinal sides by approximately 10 mm, whereby any state of wear can be instantaneously ascertained by visual checking. An additional check by means of a measuring instrument is not necessary. As the screw bolts 5 are screwed in the segments above, efficient checking thereof and easy exchange of the segments 8, 12 are assured. This results in simplified maintenance.

The above-described arrangement of the segments on the brake beams is responsible for a distinct reduction of the frequency as well as of the medium intensity of the squeaking sounds during the braking operation of the railway cars passing on the rails. The reduction amounts to 10–15 dB (A). The squeaking sounds occur up to 30 times less frequently as with the brake beams according to Austrain patent No. 337,246.

We claim:

1. A railway car retarder comprising:
   two elongated brake beams for location on opposite sides of a track rail and running parallel with the rail,
   the longitudinal side of each beam facing the rail having a longitudinal recess therein with a substantially horizontal bottom wall and vertical rear wall, the bottom wall of the recess being broader than the height of the rear wall of the recess,
   the recess of each beam having a plurality of longitudinally spaced web ribs extending upwardly from the bottom wall of the recess and running transversely to the longitudinally axis of said recess to divide the recess into a plurality of adjacent compartments,
   a braking shoe for each beam formed by a plurality of segments, each said segment fitting within a respective compartment of said recess and resting against the bottom and rear walls thereof with the web ribs at the ends of said compartments forming longitudinal support for said segments, a lateral surface of the segments of each brake shoe extending inwardly of the beam toward the rail such that a braking groove is formed between the brake shoes to engage the wheels of a rail car passing in the groove,
   and means passing through said segments and extending perpendicular to the bottom wall of said recess for removably fastening each segment in a respective compartment.

2. A car retarder according to claim 1 wherein said means for fastening said segments in said compartments comprise screw bolts, the lateral surfaces of said segments abutting against said web ribs being shorter than the lateral surface of said segments serving as the brake surface and the lateral brake surface being exposed and extending beyond the longitudinal side of the beams facing the rail.

3. A car retarder according to claim 1, wherein at least one of the segments arranged on one of the beams comprises a sandwich of at least two horizontal layers of different materials lying one on top of the other.

* * * * *